United States Patent
Kim et al.

(10) Patent No.: US 11,846,652 B2
(45) Date of Patent: Dec. 19, 2023

(54) WHEEL SPEED SENSOR

(71) Applicant: Sumitomo Wiring Systems, Ltd., Yokkaichi (JP)

(72) Inventors: Kyungwoo Kim, Yokkaichi (JP); Toshinari Kobayashi, Yokkaichi (JP); Hironobu Yamamoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 305 days.

(21) Appl. No.: 17/279,702

(22) PCT Filed: Sep. 20, 2019

(86) PCT No.: PCT/JP2019/037014
§ 371 (c)(1),
(2) Date: Mar. 25, 2021

(87) PCT Pub. No.: WO2020/071161
PCT Pub. Date: Apr. 9, 2021

(65) Prior Publication Data
US 2022/0034932 A1 Feb. 3, 2022

(30) Foreign Application Priority Data
Oct. 3, 2018 (JP) ................. 2018-188106

(51) Int. Cl.
*G01P 3/48* (2006.01)
*G01P 3/487* (2006.01)
*B60W 40/105* (2012.01)
*G01D 5/14* (2006.01)

(52) U.S. Cl.
CPC .......... *G01P 3/487* (2013.01); *B60W 40/105* (2013.01); *G01D 5/145* (2013.01)

(58) Field of Classification Search
CPC ...................................... G01P 3/487
See application file for complete search history.

(56) References Cited

U.S. PATENT DOCUMENTS

| 5,134,371 | A | * | 7/1992 | Watanabe | ............... | G01D 5/147 |
| | | | | | | 324/252 |
| 6,661,225 | B2 | | 12/2003 | Toyoda et al. | | |
| 9,863,971 | B2 | * | 1/2018 | Yamamoto | ............... | G01P 3/481 |
| 2017/0153265 | A1 | | 6/2017 | Yamamoto et al. | | |
| 2019/0094044 | A1 | * | 3/2019 | Onimoto | ................ | G01D 5/142 |

OTHER PUBLICATIONS

International Serach Report, Application No. PCT/JP2019/037014, dated Oct. 15, 2019.

* cited by examiner

*Primary Examiner* — Reena Aurora
(74) *Attorney, Agent, or Firm* — Honigman LLP

(57) ABSTRACT

A wheel speed sensor includes a plurality of magnetic field detectors configured to output detection signals that correspond to magnetic field fluctuation caused by a rotation of a rotor; and an attachment member that includes an attachment portion that is to be attached to a vehicle and a holding portion that is configured to hold the plurality of magnetic field detectors, and that, in a state in which the attachment portion is attached to the vehicle, when viewed along a center axial direction of the rotor, holds the plurality of magnetic field detectors at a position that is closer to a center line, which passes centrally between an outer peripheral line that depicts the outer periphery of the rotor and an inner peripheral line that depicts the inner periphery of the rotor, than to the outer peripheral line and the inner peripheral line.

6 Claims, 6 Drawing Sheets

WHEEL SPEED SENSOR

CROSS-REFERENCE TO RELATED APPLICATIONS

This application is the U.S. national stage of PCT/JP2019/037014 filed on Sep. 20, 2019, which claims priority of Japanese Patent Application No. JP 2018-188106 filed on Oct. 3, 2018, the contents of which are incorporated herein.

TECHNICAL FIELD

The present disclosure relates to a wheel speed sensor.

BACKGROUND

JP 2017-96828A discloses a wheel speed sensor that includes a plurality of detection elements that detect fluctuations in magnetic fields caused by the rotation of a rotor that rotates with a wheel and convert this fluctuation into an electric signal, and an attachment member that is a member that is fixed to a vehicle and holds the detection elements as a single body. The front surfaces of the detection elements are arranged opposing the plate surface of the rotor in the vicinity of the outer edge portion thereof.

However, it is thought that the magnetic flux density barely changes due to the rotation of the rotor in places away from the outer edge portion side of the rotor. With the technique disclosed in JP 2017-96828A, the front faces of the detection elements are provided in the vicinity of the outer edge portion of the plate surface of the rotor, and therefore there is concern that it may become difficult to improve the accuracy of detecting the speed of a wheel.

An object of the present disclosure is to make it possible to improve the accuracy of detecting the speed of a wheel with a wheel speed sensor.

SUMMARY

A wheel speed sensor of the present disclosure is to be arranged opposing a ring-shaped rotor that rotates in synchronization with rotation of a wheel and exhibits magnetic poles that are mutually different and alternate in a circumferential direction, the wheel speed sensor including: a plurality of magnetic field detectors configured to output detection signals that correspond to magnetic field fluctuation caused by rotation of the rotor; and an attachment member that includes an attachment portion that is to be attached to a vehicle and a holding portion that is configured to hold the plurality of magnetic field detectors, and that, in a state in which the attachment portion is attached to the vehicle, when viewed along a center axial direction of the rotor, holds the plurality of magnetic field detectors at a position that is closer to a center line, which passes centrally between an outer peripheral line that depicts the outer periphery of the rotor and an inner peripheral line that depicts the inner periphery of the rotor, than to the outer peripheral line and the inner peripheral line.

Advantageous Effects of Invention

With the present disclosure, the accuracy with which the speed of a wheel is detected by a wheel speed sensor is improved.

DETAILED DESCRIPTION OF PREFERRED EMBODIMENTS

Figure 1:
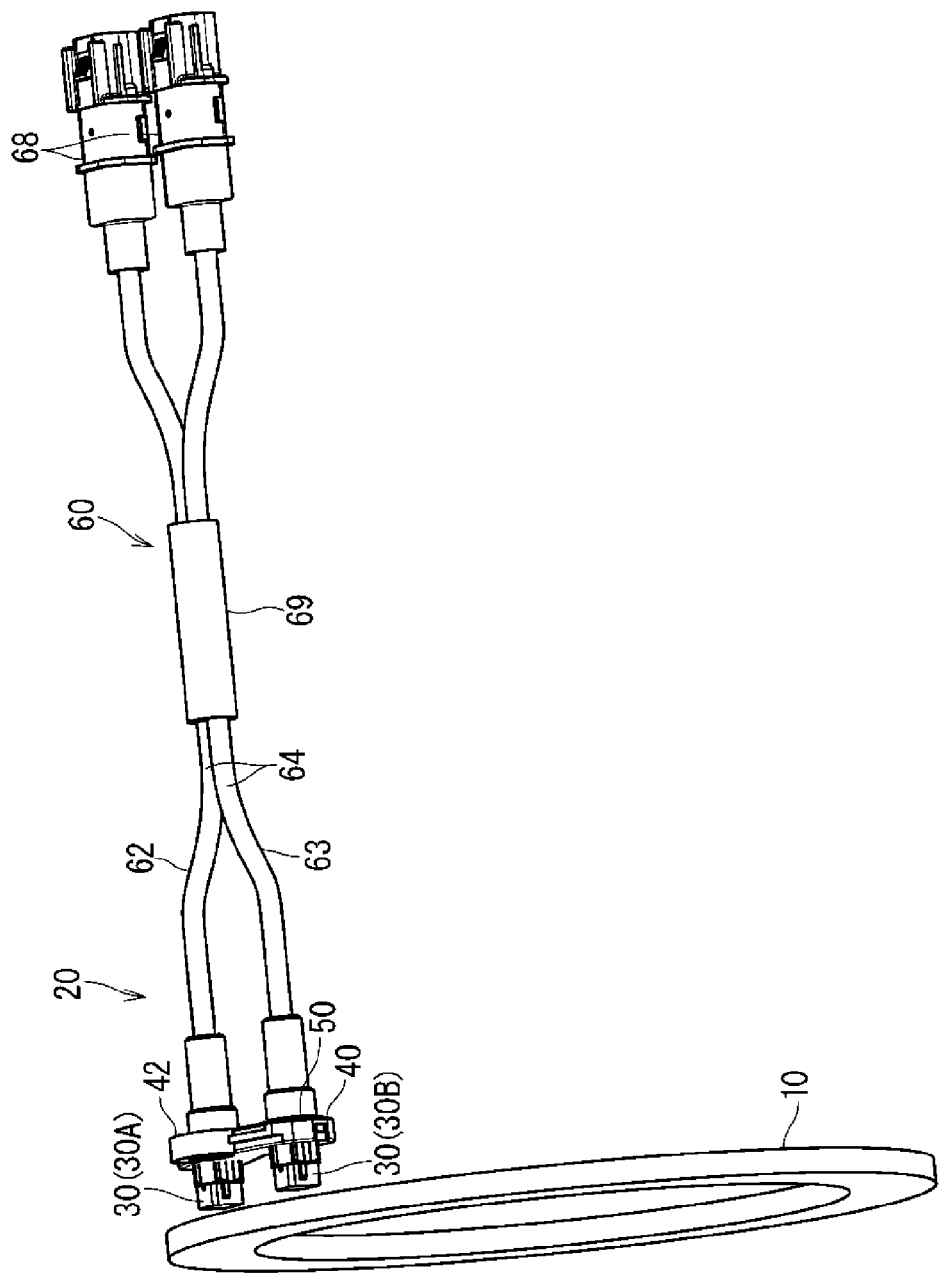
FIG. 1 is a perspective view showing a wheel speed sensor according to an embodiment.

First, embodiments of the present disclosure will be listed and described.

A wheel speed sensor of the present disclosure is as follows.

A wheel speed sensor that is to be arranged opposing a ring-shaped rotor that rotates in synchronization with rotation of a wheel and exhibits magnetic poles that are mutually different and alternate in a circumferential direction, the wheel speed sensor including: a plurality of magnetic field detectors configured to output detection signals that correspond to magnetic field fluctuation caused by rotation of the rotor; and an attachment member that includes an attachment portion that is to be attached to a vehicle and a holding portion that is configured to hold the plurality of magnetic field detectors, and that, in a state in which the attachment portion is attached to the vehicle, when viewed along a center axial direction of the rotor, holds the plurality of magnetic field detectors at a position that is closer to a center line, which passes centrally between an outer peripheral line that depicts the outer periphery of the rotor and an inner peripheral line that depicts the inner periphery of the rotor, than to the outer peripheral line and the inner peripheral line.

Thus, the magnetic field detectors are held at a position that is closer to the center line of the rotor than to the outer peripheral line or to the inner peripheral line of the rotor. Change in magnetic flux density caused by the rotation of the rotor at the center line portion of the rotor is large, and therefore the accuracy with which the speed of the wheel is detected by the wheel speed sensor is improved.

Each of the plurality of magnetic field detectors includes an element surface that is to be arranged opposing the rotor, and when viewed along the center axial direction of the rotor, the attachment member may also hold the plurality of magnetic field detectors such that the element surfaces of the plurality of magnetic field detectors are positioned between the outer peripheral line and the inner peripheral line.

In this case, the element surfaces of the magnetic field detectors are positioned between the outer peripheral line and the inner peripheral line, and therefore it is expected that the change in magnetic flux density caused by the rotation of the rotor becomes larger with respect to the magnetic field detectors, and the accuracy with which the speed of the wheel is detected by the wheel speed sensor is improved.

The attachment member may also hold the plurality of magnetic field detectors such that the plurality of magnetic field detectors have the same orientation with respect to the rotor.

In this case, the magnetic field detectors have the same orientation with respect to the rotor, and therefore the detection signals that are based on the same conditions are output from the plurality of magnetic field detectors.

The attachment member may also hold the plurality of magnetic field detectors such that each of the plurality of magnetic field detectors has a line symmetric orientation with regards to any line along a radial direction of the rotor.

In this case, each of the magnetic field detectors has a line-symmetric orientation with respect to any line that runs along the radial direction of the rotor, and therefore detection signals that are based on the same detection conditions are output from the magnetic field detectors. Also, regardless of whether the rotor rotates in the forward direction or the reverse direction, the detection signals that are based on the same detection conditions are output from the magnetic field detectors.

The attachment member may also hold the plurality of magnetic field detectors such that, when P is a pole pair count of the rotor, N is the number of magnetic field detectors, and θ is the angle formed by a plurality of lines that link the center of the rotor and the plurality of magnetic field detectors, θ=((180/N)+n×180)/P (where n is an integer of 0 or more) is satisfied.

In this case, the magnetic field detectors can output signals at a phase difference of ((180/N)+n×180) deg, with respect to the phase associated with the rotation of the rotor. For this reason, it is possible to increase the detection resolution based on the output signals of the plurality of magnetic field detectors.

Specific examples of the wheel speed sensor of the present disclosure will be described below with reference to the drawings. It should be noted that the present disclosure is not limited to these examples, but is indicated by the scope of the claims, and is intended to include all changes within the scope of the claims and meanings equivalent to the scope of the claims.

EMBODIMENTS

Figure 2:
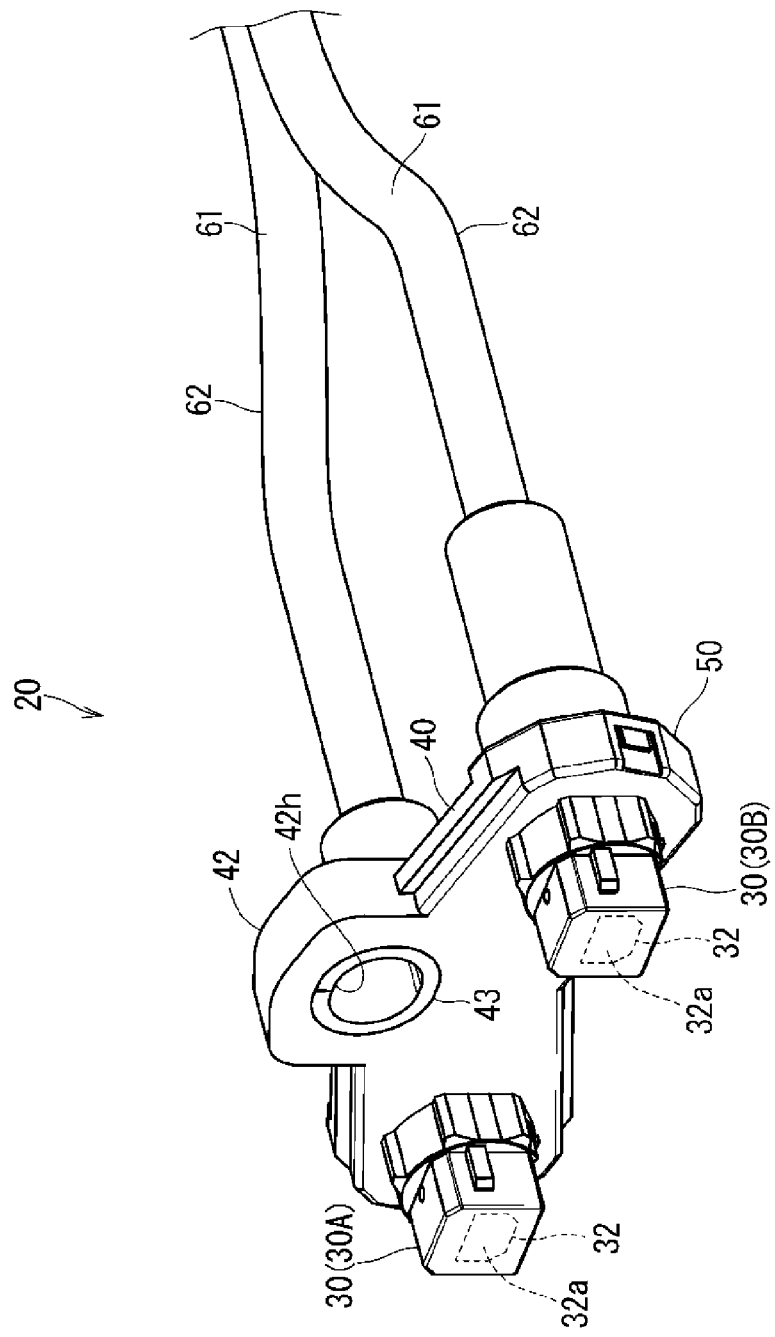
FIG. 2 is a perspective view showing the same wheel speed sensor.
Figure 3:
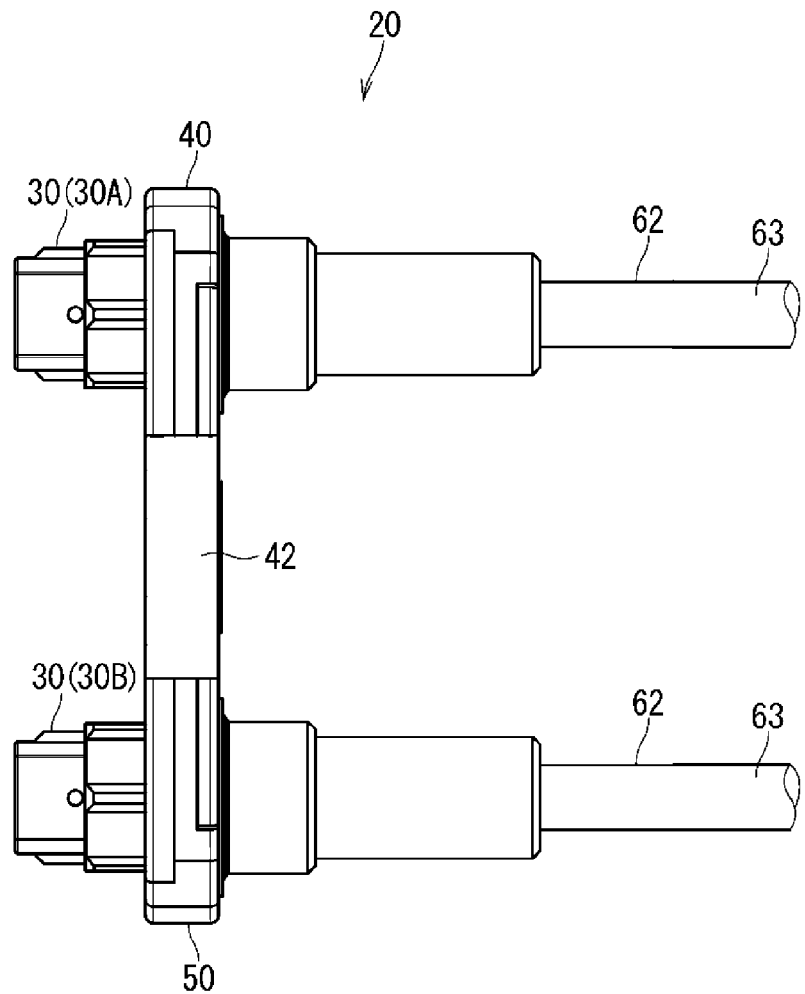
FIG. 3 is a plan view showing the same wheel speed sensor.
Figure 4:
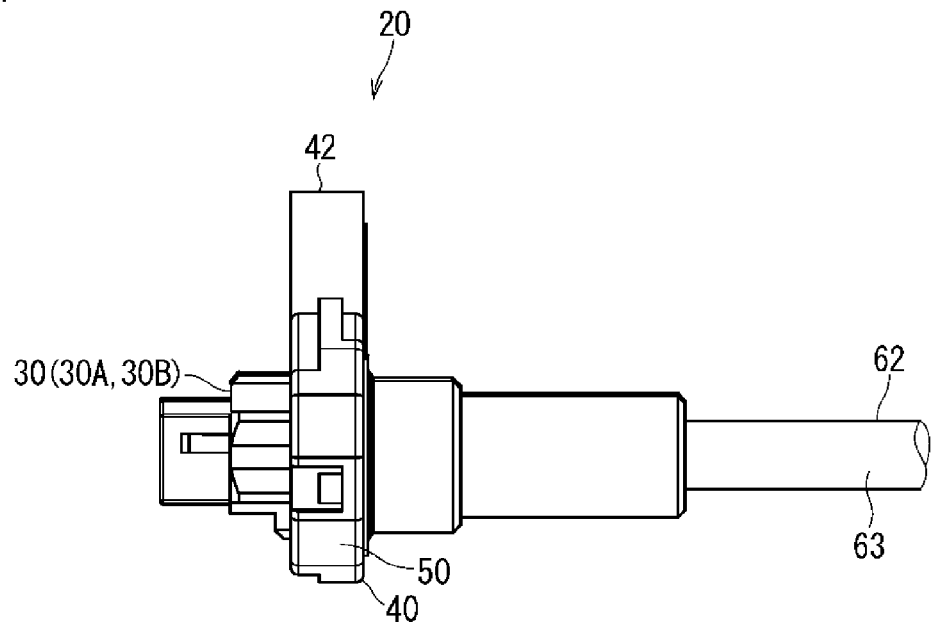
FIG. 4 is a side-view showing the same wheel speed sensor.
Figure 5:
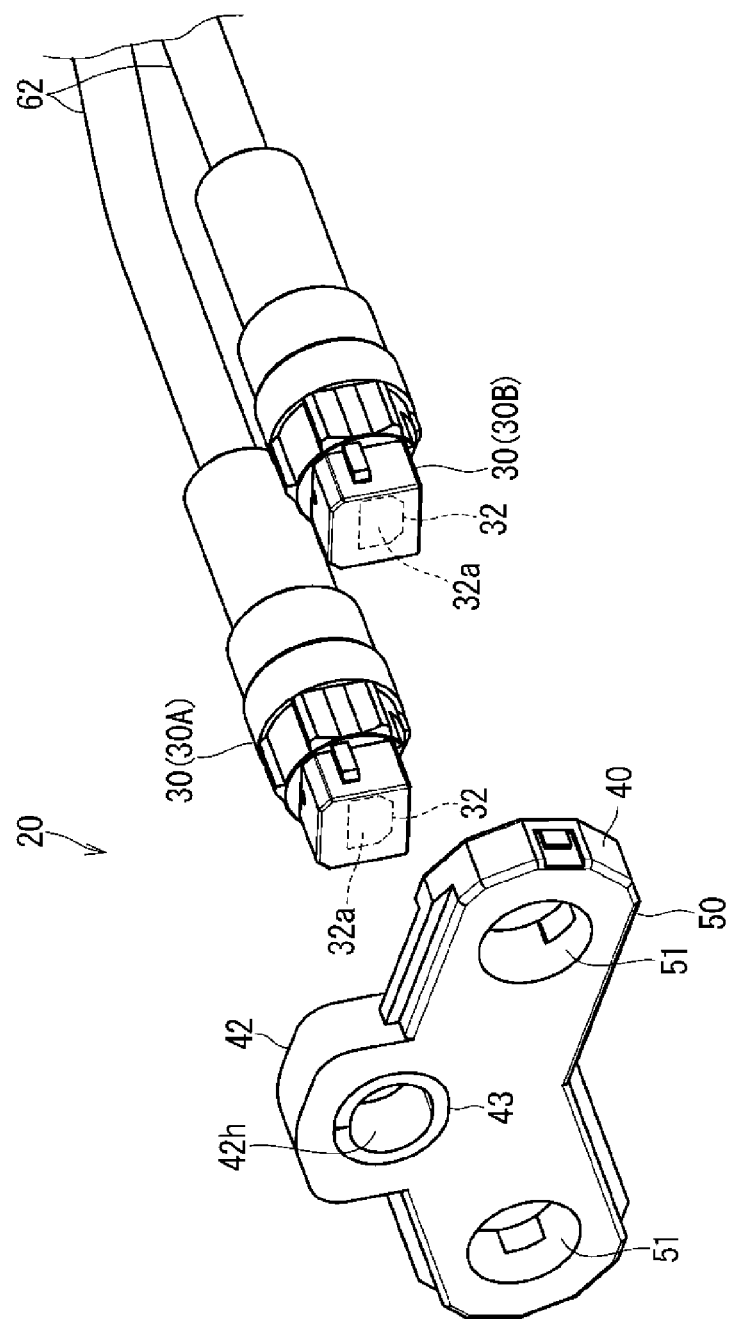
FIG. 5 is an exploded perspective view showing the same wheel speed sensor.
Figure 6:
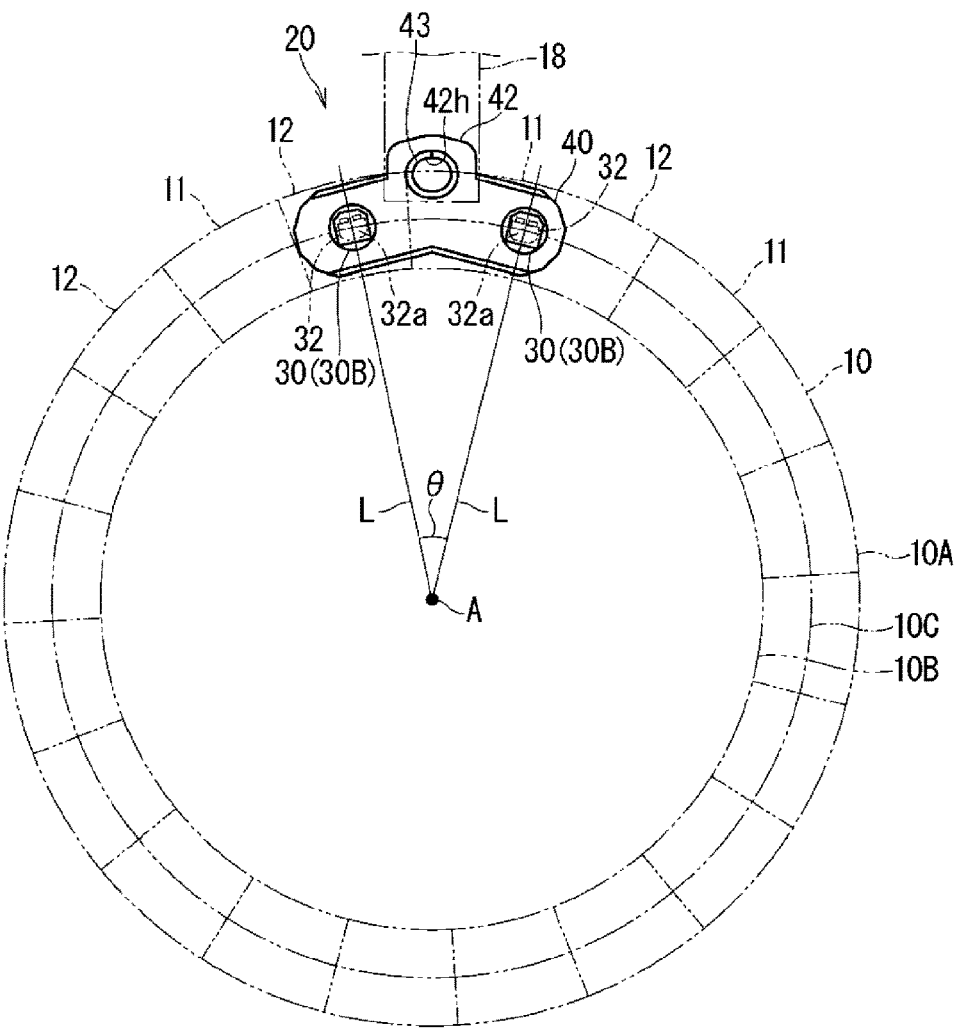
FIG. 6 is a diagram showing the positional relationship of the wheel speed sensor in relation to the rotor.
Figure 7:
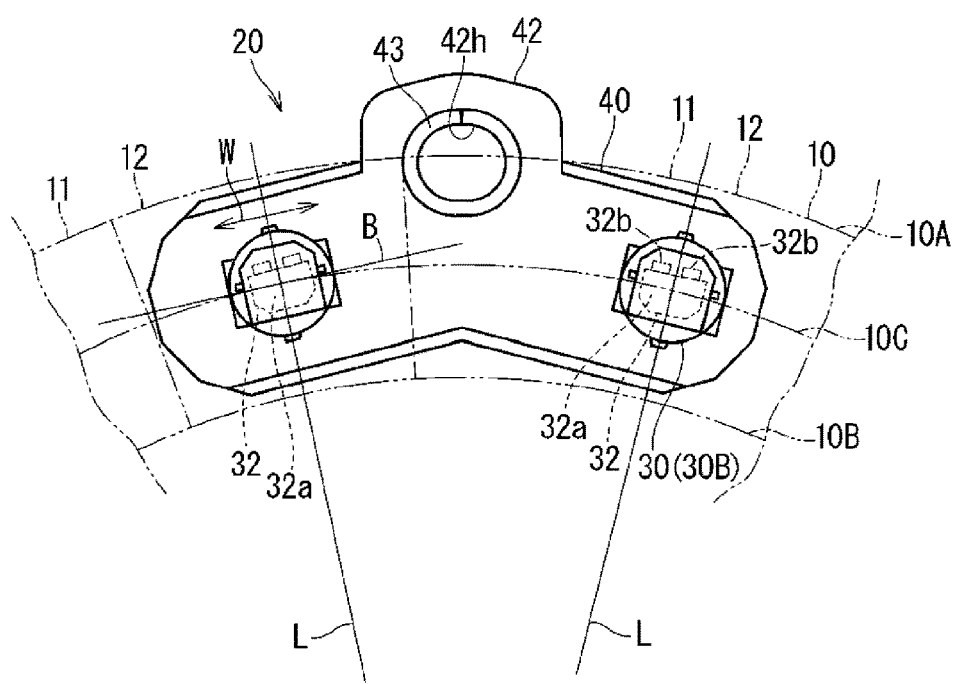
FIG. 7 is a partially enlarged view of FIG. 6.

The following is a description of a wheel speed sensor according to an embodiment. FIGS. 1 and 2 are perspective views showing a wheel speed sensor 20, FIG. 3 is a plan view showing the wheel speed sensor 20, FIG. 4 is a side-view showing the wheel speed sensor 20, and FIG. 5 is an exploded perspective view showing the wheel speed sensor 20. FIG. 1 illustrates a rotor 10 that opposes the wheel speed sensor 20. FIG. 6 is a diagram showing the positional relationship of the wheel speed sensor 20 with in relation to the rotor 10, and FIG. 7 is a partially enlarged view of FIG. 6.

The wheel speed sensor 20 is arranged opposing the rotor 10. The rotor 10 is a ring-shaped member that rotates in synchronization with the rotation of a wheel. The wheel may be the wheel of an automobile, for example. The rotor 10 is attached to the wheel or to a member that rotates in synchronization with the wheel, and rotates in synchronization with the rotation of the wheel. That is to say that the rotor 10 rotates in a direction corresponding to the direction in which the wheel rotates, and also rotates at a speed that is proportional to the speed at which the wheel rotates. For this reason, detecting the rotational speed and the rotational direction of the rotor 10 makes it possible to detect the rotational speed and the rotational direction of the wheel.

The rotor 10 is formed into a ring-shape. In FIGS. 1, 6, and 7, if viewed along the center axial direction of the rotor 10, an outer peripheral line 10A that depicts the outer periphery of the rotor 10 depicts a circle, and an inner peripheral line 10B that depicts the inner periphery of the rotor 10 depicts a circle. The line at the center between the outer peripheral line 10A and the inner peripheral line 10B is called a center line 10C (see FIGS. 6 and 7). Here, the center line 10C depicts a circle whose radius is the average of the radius of the outer peripheral line 10A and the radius of the inner peripheral line 10B.

The outer peripheral line 10A that depicts the outer periphery of the rotor 10 need not be a circle, and may also be a polygonal shape or the like. The inner peripheral line 10B that depicts the inner periphery of the rotor 10 need not be a circle, and may also be a polygonal shape or the like.

The center line 10C may also be regarded as a line formed by a collection of center points between two points where each of a plurality of lines that extend in the radial direction of a circle centered around the center axis of the rotor 10 meet the outer peripheral line 10A and the inner peripheral line 10B.

The rotor 10 exhibits magnetic poles (an N-pole and a S-pole) that are mutually different and alternate along the circumferential direction thereof (see FIGS. 6 and 7). N-polarity portions 11 that exhibit the N pole and S-polarity portions 12 that exhibit the S pole are provided over ranges that have the same central angle with respect to the central axis of the rotor 10, and are provided alternately along the circumferential direction of the rotor 10. The wheel speed sensor 20 is arranged opposing the rotor 10 at a fixed position in the circumferential direction of the rotor 10. When the rotor 10 rotates, the N-polarity portions 11 and the S-polarity portions 12 of the portion of the rotor 10 that opposes the wheel speed sensor 20 alternate with each other, and fluctuations in the magnetic field periodically change with respect to the wheel speed sensor 20. The wheel speed sensor 20 outputs detection signals in accordance with these fluctuations in the magnetic field.

The wheel speed sensor 20 includes a plurality of magnetic field detectors 30 and an attachment member 40.

The magnetic field detectors 30 output detection signals in accordance with fluctuations in the magnetic field caused by the rotation of the rotor 10. The magnetic field detectors 30 are each connected to a wiring portion 60. The detection signals of the magnetic field detectors 30 are output through the wiring portion 60. The attachment member 40 includes an attachment portion 42 that is to be attached to a vehicle and a holding portion 50 that holds the magnetic field detectors 30, and the magnetic field detectors 30 are held at a fixed position with respect to the rotor 10 by the attachment portion 42 being attached to the vehicle.

More specifically, the magnetic field detectors 30 include detection elements 32 and element cladding portions 36.

The detection elements 32 are elements that output detection signals in accordance with fluctuations in the magnetic field and, for example, may be constituted by Hall elements, Hall ICs that include Hall elements, or the like. As the detection signals to be output in accordance with fluctuations in magnetic fields, the detection elements 32 may output analog signals in accordance with fluctuations in the magnetic field, and may output digital signals in accordance with fluctuations in the magnetic field. Each detection element 32 includes an element surface 32a and a plurality (two, for example) of terminal portions 32b (see FIG. 7). The element surfaces 32a are arranged opposing the rotor 10. The terminal portions 32b are connected to cables 62 that extend rearward and are included in the wiring portion 60 described above. Capacitors may also be interposed between the plurality (two, for example) of terminal portions 32b.

The element cladding portions 36 cover the detection elements 32 and are formed from a resin or the like. The element cladding portions 36 cover the whole of the detection elements 32 and the portion at which the terminal portions 32b of the detection elements 32 and the wires are connected to each other. In other words, the detection elements 32 are covered by the element cladding portions 36, and the wires that are connected to the detection elements 32 extend from the element cladding portions 36. The element surfaces 32a are also covered by the element cladding portions 36. The capacitors may also be covered by the element cladding portions 36. Note that the wires are part of the cables 62, and the end portions of the wires extend from the end portions of the cables 62.

The element cladding portions 36 may also be constituted by a first resin molded portion and a second resin molded portion. The first resin molded portion is insert molded with the detection elements 32 and the portion at which the terminal portions 32b and the wires are connected to each other as the insert portion. The second resin molded portion is insert molded with the first resin molded portion as the insert portion. In this way, by insert molding the first resin molded portion in a state in which the detection elements 32 are fixed inside of a mold as the insert portion, it is possible to improve the positional accuracy of the detection elements 32 in the first resin molded portion. Then, by insert molding the second resin molded portion with the first resin molded portion as the insert portion, it is possible to improve the positional accuracy of the first resin molded portion in the second resin molded portion and thus the positional accuracy of the detection elements 32. As a result, the positional accuracy of the detection elements 32 in the magnetic field detectors 30 is improved, and the positional accuracy of the detection elements 32 with respect to the attachment member 40 is improved. Thus, in a state in which the attachment member 40 is attached to the vehicle, the positional accuracy of the detection elements 32 with respect to the rotor 10 is improved, thereby contributing to an increase in the accuracy with which the wheel speed is detected.

Note that a pre-molded holder may be used instead of the first resin molded portion. In such a case, the holder may hold the detection elements 32 and the portion at which the plurality of terminal portions 32b and wires are connected to each other, and a portion corresponding to the second resin molded portion may be insert molded with the held components as the insert portion. In the element cladding portions 36, portions corresponding to the first resin molded portion and the second resin molded portion may also be insert molded with the detection elements 32 and the portion at which the terminal portions 32b and wires are connected to each other as the insert portion.

The wiring portion 60 transmits the detection signals from the magnetic field detectors 30 to another component. Here, the wiring portion 60 is constituted by a number of cables 62 that corresponds to the number of detection elements 32.

Each cable 62 is constituted by a plurality (two in accordance with the number of terminal portions 32b, for example) of wires, and a sheath 64.

The wires include core wires and covers that surround the core wires. The core wires are conductive wires formed from copper, a copper alloy, aluminum, an aluminum alloy, or the like. The core wires may be single wires or may be stranded wires. The covers are insulating covers formed from a resin or the like, and are formed by extrusion coating resin around the core wires.

The sheaths 64 each cover a plurality of wires. The end portions of the wires are exposed from both ends of each sheath 64. The core wires at the end portions of the wires are exposed at one end of each cable 62, and these exposed core wires are connected to the terminals of the detection elements 32 described above. The core wires at the end portions of the plurality of wires are connected to connector terminals at the other end of each cable 62. Connectors 68 are attached to the other end portions of the cables 62 by the connector terminals being inserted into and connected to the connectors 68. The magnetic field detectors 30 are connected to a control device or the like installed in the vehicle, and this connection is enabled by the connectors 68 being connected to other connectors of the vehicle. The detection signals from the magnetic field detectors 30 are shared with control processing or the like in an ABS (Anti-Lock Brake System) in order to prevent the wheels from locking up when braking.

Intermediate portions of the plurality of cables 62 in the extending direction are bundled by a bundling member 69 such as a rubber tube, but this is not absolutely necessary.

The attachment member 40 includes the attachment portion 42 and the holding portion 50. The attachment portion 42 is attached to the vehicle. The holding portion 50 holds the magnetic field detectors 30. The vehicle is provided with an attachment part 18 (see FIG. 6) at a circumferential portion of the rotor 10, but the attachment part 18 does not rotate with the rotor 10. By the attachment part 18 being attached to the attachment portion 42, the wheel speed sensor 20 can be attached to the vehicle in at fixed position relative to the vehicle and can be attached so as not to rotate with the rotor 10.

More specifically, the attachment member 40 is formed as single piece with the attachment portion 42 and the holding portion 50 by resin or the like.

The holding portion 50 is shaped like a plate in the shape of the letter "V". The holding portion 50 may also be shaped like a letter "V" whose angle corresponds to the curvature of the rotor 10 so that the holding portion 50 can be arranged along the rotor 10. Here, the holding portion 50 is shaped like the letter "V" having an obtuse angle. The holding portion 50 may also be formed in a different shape, such as an arched plate shape or a rectangular plate shape.

Two holding holes 51 are formed in respective end portions of the holding portion 50 (see FIG. 5).

The holding holes 51 are formed in a through-hole shape that allows the magnetic field detectors 30 to be inserted therein. The magnetic field detectors 30 can be insertably attached to the holding holes 51. By insertably attaching the magnetic field detectors 30 to the holding holes 51, the magnetic field detectors 30 are attached to the attachment member 40 at a fixed position and in a fixed orientation. In such a state, the magnetic field detectors 30 are held so as to maintain a fixed position and fixed orientation relative to each other. Here, two magnetic field detectors 30 are held by respective ends of the holding portion 50 in a parallel orientation and with the element surfaces 32a facing the same direction. The holding portion 50 holds the magnetic field detectors 30, and therefore if the attachment member 40 is attached to the vehicle, then it is possible to attach the magnetic field detectors 30 to the vehicle together at a fixed position in a fixed orientation.

The configuration with which the holding portion 50 holds the plurality of magnetic field detectors 30 is not limited to the example described above. A portion corresponding to the attachment member 40 may also be insert molded with a portion of the magnetic field detectors 30 as the insert portion. The magnetic field detectors may also be attached to the attachment member with a screw or the like.

Also, if the holding portion holds three or more magnetic field detectors, one or more holding holes may be added to the central portion of the holding portion in the extending direction thereof.

The attachment portion 42 protrudes from a portion on an outer side of a corner portion of the holding portion 50. An attachment hole 42h is formed in the attachment portion 42. A ring member 43 formed from a metal or the like may also be fitted into the attachment hole 42h.

Thus, in a state in which a bolt or the like is inserted in the attachment hole 42h, the attachment portion 42 is attached to the attachment part 18 at a fixed position and in a fixed orientation by screwing and tightening the bolt into the attachment part 18, or by inserting the bolt that protrudes from the attachment part 18 into the attachment hole 42h and screwing and tightening a nut onto the bolt. In this way, the magnetic field detectors 30 held by the holding portion 50 that is continuous with the attachment portion 42 are held at a fixed position and in a fixed orientation.

The configuration with which the attachment portion 42 is attached to the vehicle is not limited to the example described above. For example, the attachment portion may also include a portion that exhibits a clip or clamp shape that locks the attachment portion to the vehicle and stops the attachment portion from coming loose from the vehicle.

In a state in which the attachment portion 42 is attached to the vehicle, the attachment member 40 holds the magnetic field detectors 30 at a position that is closer to the center line 10C than to the outer peripheral line 10A or to the inner peripheral line 10B when viewed along a center axis A direction of the rotor 10 (see FIGS. 6 and 7). In other words, the shape of the attachment member 40, the structure with which the attachment portion 42 is attached to the vehicle, and the holding structure of the holding portion 50 by the holding portion 50 are set so that the magnetic field detectors 30 can be held in the position described above based on the positional relationship between the attachment part 18 of the vehicle and the rotor 10.

Here, the attachment part 18 of the vehicle is provided on the outer peripheral side of the rotor 10, and the attachment portion 42 is attached to the attachment part 18 in an orientation in which the holding portion 50 faces the rotor 10 side.

The holding portion 50 is shaped like a letter "V" that corresponds to the curvature of the rotor 10, and therefore the holding portion 50 is arranged along the extending direction of the rotor 10 on the outer side of one end surface of the rotor 10. The plurality (two) of magnetic field detectors 30 held at respective end portions of the holding portion 50 are arranged along the extending direction of the rotor 10 on the outer side of the one end surface of the rotor 10.

In such a state, the axial direction of the two magnetic field detectors 30 extends along the center axis A of the rotor 10. The two magnetic field detectors 30 are separated from each other along the extending direction of the rotor 10. Also, the two magnetic field detectors 30 are held at a position that is closer to the center line 10C than to the outer peripheral line 10A or to the inner peripheral line 10B as described above.

More specifically, the element surfaces 32a of the two magnetic field detectors 30 extend along a plane that is orthogonal to the center axis A of the rotor 10. The two element surfaces 32a oppose one end surface of the rotor 10 and are spaced apart from the end surface along the center axis A direction of the rotor 10. The two element surfaces 32a are positioned closer to the center line 10C than to the outer peripheral line 10A or to the inner peripheral line 10B as described above, and are spaced apart from each other along the center line 10C. In such a case, the centers (the geometric centers, for example) of the two element surfaces 32a may be positioned on the center line 10C, but this is not absolutely necessary. It is sufficient that the centers (the geometric centers, for example) of the two element surfaces 32a are positioned closer to the center line 10C than to the outer peripheral line 10A or to the inner peripheral line 10B as described above.

Also, the two element surfaces 32a may be positioned between the outer peripheral line 10A and the inner peripheral line 10B when viewed along the center axis A direction of the rotor 10. In other words, when viewed along the center axis A direction of the rotor 10, neither of the two element surfaces 32a protrude out from the inner peripheral side or the outer peripheral side of the rotor 10, and the whole region of the two element surfaces 32a may also oppose one end surface of the rotor 10. FIGS. 6 and 7 show an example of such an arrangement.

The attachment member 40 may also hold the magnetic field detectors 30 (see FIG. 7) so that the magnetic field detectors 30 have the same orientation with respect to the rotor 10. Also, the attachment member 40 may also hold the magnetic field detectors such that each of the magnetic field detectors 30 has an orientation that is line-symmetric to the line L that extends along the radial direction of the rotor 10. The lines L may be, for example, lines that run through the magnetic field detectors 30, or more specifically, may be lines that run through the center of the element surfaces 32a.

Here, the holding portion 50 is shaped like a letter "V" that corresponds to the curvature of the rotor 10, and the holding holes 51 in both end portions of the holding portion 50 are held closer to the center line 10C than to the outer peripheral line 10A or to the inner peripheral line 10B as described above. The magnetic field detectors 30 are held in the holding holes 51 in an orientation in which a width direction W of the element surfaces 32a runs along a direction B that is tangent to the rotor 10. Here, the width direction W of each element surface 32a may be, for example, the extending direction of the long-sides of the element surface 32a that define the periphery thereof, or the extending direction of the side from which the terminal portions 32b extend. Also, the tangential direction B may be a direction that, at an intersection between the width direction W and any line L along the radial direction of the rotor 10, is tangent to a circle that is centered on the central axis of the rotor 10 and passes through the intersection.

In this way, if the magnetic field detectors 30 are held by the attachment member 40 such that the magnetic field detectors 30 have the same orientation relative to the rotor 10, the magnetic fields of the magnetic field detectors 30 fluctuate under similar conditions as the rotor 10 rotates. Therefore, it is expected that detection signals having similar waveforms are output from each of the plurality of magnetic field detectors 30 as the rotor 10 rotates. In view of this, it is not essential that the magnetic field detectors 30 have an orientation that is line-symmetric to any of the lines L that run along the radial direction of rotor 10.

However, if the plurality of magnetic field detectors 30 are held by the attachment member 40 such that the magnetic field detectors 30 have an orientation that is line-symmetric to any of the lines L that run along the radial direction of the rotor 10, the magnetic fields of the magnetic field detectors 30 fluctuate under the same conditions regardless of whether the rotor 10 rotates in a predetermined direction or a direction that is the reverse of the predetermined direction. For this reason, regardless of the rotational direction of the rotor 10, it is expected that detection signals having the same waveforms are output from each of the magnetic field detectors 30.

The detection signals from the magnetic field detectors 30 are used for objectives such as increasing the resolution of detecting the rotational speed of the wheels, detecting the rotational direction of the wheels, and providing redundancy for signal output in case any of the magnetic field detectors 30 malfunction.

An example of a configuration that can be applied to increase the resolution of detecting the rotational speed of the wheel will be described below.

Figure 8:
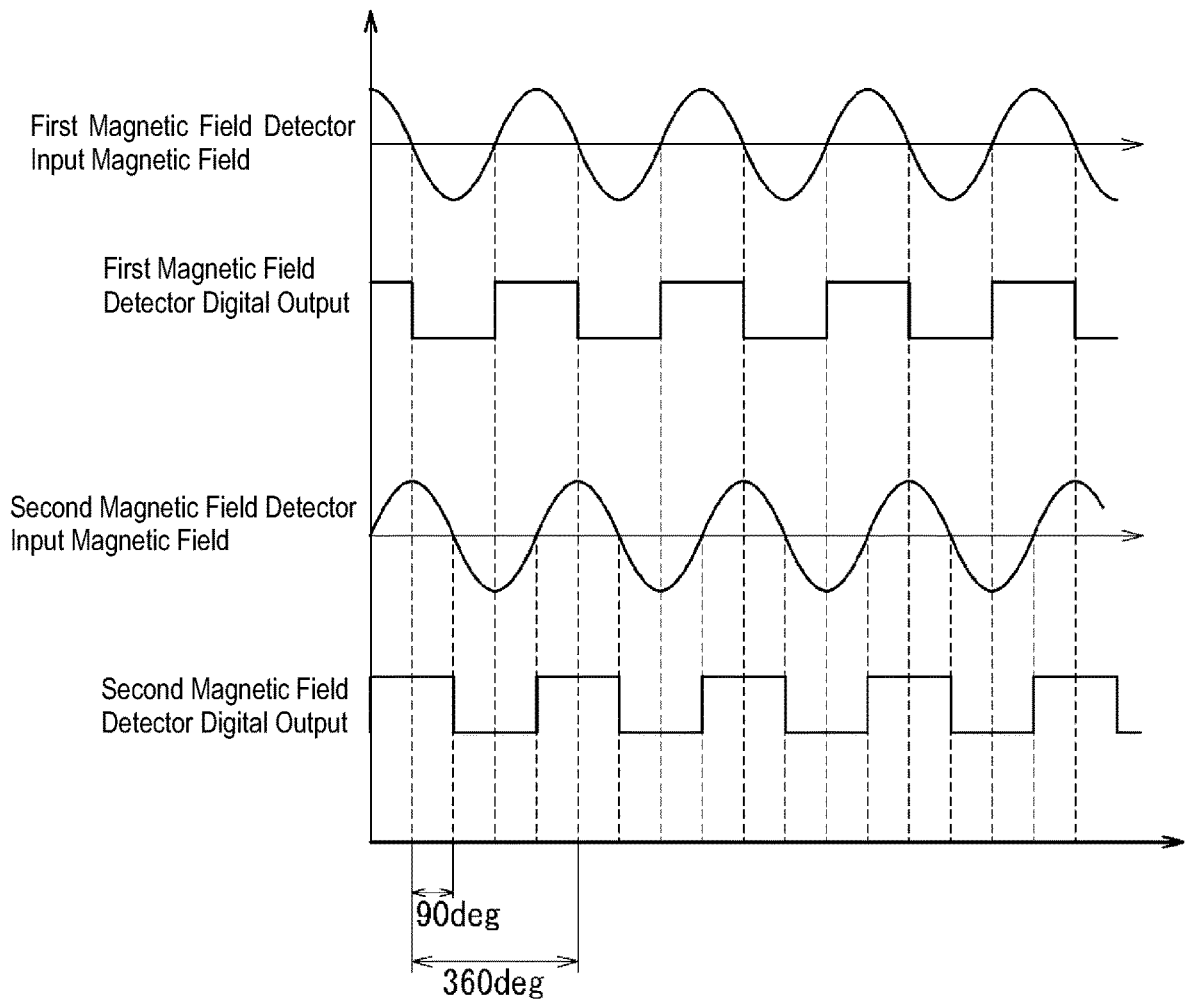
FIG. 8 is an illustrative chart showing examples of detection signals are based on a plurality of magnetic field detectors.

Here, the magnetic field detectors 30 include a first magnetic field detector 30A and a second magnetic field detector 30B. As shown in FIG. 8, when the rotor 10 rotates, the magnetic flux input to the first magnetic field detector 30A fluctuates in a sine curve. Pulse signals are obtained at a timing when the signal is a predetermined threshold or higher based on the detection signal that corresponds to the magnetic flux input.

As described above, the first magnetic field detector 30A and the second magnetic field detector 30B are arranged spaced apart from each other along the circumferential direction of the rotor 10, and therefore the magnetic flux input to the second magnetic field detector 30B is delayed according to the distance between the first magnetic field detector 30A and the second magnetic field detector 30B and fluctuates in a sine curve, with respect to the magnetic flux input to the second magnetic field detector 30B. Based on the detection signals according to the magnetic flux input, pulse signals are obtained that are delayed according to the distance between the first magnetic field detector 30A and the second magnetic field detector 30B at a timing when the signal is a predetermined threshold or higher.

The time required for one N-polarity portion 11 and one S-polarity portion 12 of the rotor 10 (an N-polarity portion 11 and an S-polarity portion 12 that are adjacent to each other) to pass a location opposing the first magnetic field detector 30A due to the rotation of the rotor 10 is one cycle. Based on a pulse signal from one of the magnetic field detectors 30 (the first magnetic field detector 30A, for example), the rising edge and falling edge can be detected at every half-cycle, and therefore the wheel speed can be detected with a resolution corresponding to half-cycles (180 deg phase).

In a case where the first magnetic field detectors 30A and second magnetic field detectors 30B are provided, if the detection signal of the second magnetic field detector 30B is in a phase that is delayed by 90 deg (¼ cycle) with respect to the detection signal of the first magnetic field detector 30A, the rising edges of the pulse wave from the first magnetic field detector 30A, the rising edges of the pulse wave from the second magnetic field detector 30B, the falling edges of the pulse wave from the first magnetic field detector 30A, and the falling edges of the pulse wave from the second magnetic field detector 30B can be detected at every 90 deg phase (¼ cycle). Even if the pulse wave from the second magnetic field detector 30B is in a phase delayed 90 deg with respect to the pulse wave from the first magnetic field detector 30A and further delayed by a multiple n of 180 deg (where n is an integer of 0 or more), the rising edges and falling edges of the pulse wave from the first magnetic field detector 30A and the rising edges and the falling edges of the pulse wave from the second magnetic field detector 30B can be detected at every 90 deg phase (every ¼ cycle). For this reason, if the second magnetic field detector 30B is in a phase that is delayed by ((180/2)+n×180) deg with respect to the first magnetic field detector 30A, the wheel speed can be detected with a resolution corresponding to 90 deg phases (¼ cycles), and the resolution can be improved.

Also, in the case of using a plurality of magnetic field detectors 30, the rising edges and the falling edges of the pulse waves from the plurality of magnetic field detectors 30 can be detected with a fixed order in accordance with the rotational direction of the magnetic field detectors 30. For example, in a case where the detection signal of the second magnetic field detector 30B is in a phase that is delayed by 90 deg (¼ cycle) with respect to the detection signal of the first magnetic field detector 30A, if the rotor 10 rotates in a predetermined rotation direction, the rising edge of a pulse wave from the first magnetic field detector 30A, the rising edge of a pulse wave from the second magnetic field detector 30B, the falling edge of a pulse wave from the first magnetic field detector 30A, and the falling edge of a pulse wave from the second magnetic field detector 30B are detected in that order. If the rotor 10 rotates in a direction that is the reverse of the predetermined rotation direction, opposite to what is described above, the rising edge of a pulse wave from the first magnetic field detector 30A, the falling edge of a pulse wave from the second magnetic field detector 30B, the falling edge of a pulse wave from the first magnetic field detector 30A, and the rising edge of a pulse wave from the second magnetic field detector 30B are detected in that order. For this reason, it is possible to detect the rotational direction of the rotor 10, that is to say the rotational direction of the wheels, based on the order in which the rising edges and the falling edges are detected.

Consider a case in which three or more magnetic field detectors 30 are provided, and the three or more magnetic field detectors 30 are held by the attachment member at equal intervals along the extending direction of the rotor 10.

In such a case, similarly to the above description, if the detection signal of the second magnetic field detector is in a phase delayed by 60 deg (⅙ cycle) and the detection signal of the third magnetic field detector 30 is in a phase further delayed by 60 deg (⅙ cycle) with respect to the detection signal of the first magnetic field detector 30, the rising edges and the falling edges of the pulse waves of the three magnetic field detector can be detected at every 60 deg phase (every ⅙ cycle). Even if the detection signal of the second magnetic field detector and the detection signal of the three magnetic field detector 30 are further delayed by a multiple n of 180 deg, the rising edges and the falling edges of the of the pulse waves of the three magnetic field detectors can be detected at every 60 deg phase (every ⅙ cycle). For this reason, if the third magnetic field detectors are in phases that are successively delayed by ((180/3)+n×180) deg, the wheel speed can be detected with a resolution corresponding to 60 deg phases (⅙ cycles), and the resolution can be improved.

Consider a case where the above description has been generalized, N magnetic field detectors 30 are provided (N being an integer of 2 or more), and the N magnetic field detectors 30 are held by the attachment member evenly spaced apart from each other along the extending direction of the rotor 10.

In such a case, if the N magnetic field detectors 30 output detection signals in phases that are successively delayed by (180/N) deg, the rising edges and the falling edges of the pulse waves of the N magnetic field detectors 30 can be detected at every (180/N) deg phases. Even if the phase is further delayed by a multiple n of 180 deg, the rising edges and the falling edges of the pulse waves of the N magnetic field detectors can be detected at every phase of (180/N) deg.

For this reason, if the N magnetic field detectors 30 are in phases that are successively delayed by ((180/N)+n×180) deg, the wheel speed can be detected at a resolution corresponding to the phase of (180/N) deg, and the resolution can be improved.

In other words, the spaces between the N magnetic field detectors 30 on the circumferential direction of the rotor 10 can be spaces corresponding to the phase difference of ((180/N)+n×180) deg, and the resolution of detecting the wheel speed can be improved.

The above will be examined from a geometrical point of view.

First, assume that the angles formed by a plurality of lines L that link the center axis A of the rotor 10 and the N magnetic field detectors 30 is $\theta$ degrees (see FIG. 6). The lines L may also link the centers of the element surfaces 32a of the magnetic field detectors 30 and the center axis A of the rotor 10. If three or more magnetic field detectors 30 are provided, the three or more magnetic field detectors 30 are provided spaced apart from each other at even intervals along the circumferential direction of the rotor 10, and therefore $\theta$ degrees is the angle formed by the lines L that correspond to adjacent magnetic field detectors 30.

Also, assume that P is the pole pair count, which is the number of pairs of one N-polarity portion 11 and one S-polarity portion 12 of the rotor 10. In such a case, the phase difference described above can be converted to a geometric angle about the rotor 10 by dividing the phase difference by the pole pair count P Accordingly, it is sufficient that the following relational expression is satisfied.

$$\theta=((180/N)+n\times 180)/P \text{ (where } n \text{ is an integer of 0 or more)}$$

In other words, if the attachment member 40 holds the magnetic field detectors 30 so as to satisfy the above expression, it is possible to improve the resolution of detecting the wheel speed.

Figure 9:
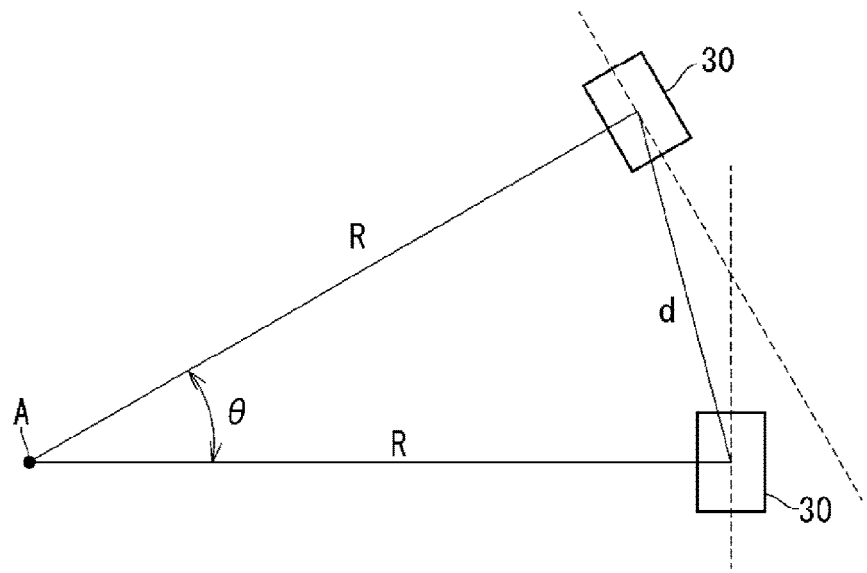
FIG. 9 is an illustrative diagram showing an example of the relationship between the angles and distances of the plurality of magnetic field detectors.

Also, as shown in FIG. 9, assume that d denotes the distance between the magnetic field detectors 30, and R denotes the distance between the center axis A of the rotor 10 and the magnetic field detectors 30. The distance d and the distance R may be a value based on the centers of the element surfaces 32a of the magnetic field detectors 30.

In such a case, it is sufficient that the following relational expression is satisfied.

$$d2=2\times R2\times(1-\cos\theta)$$

With the wheel speed sensor 20 configured as described above, the magnetic field detectors 30 are held at positions that are closer to the center line 10C than they are to the outer peripheral line 10A or to the inner peripheral line 10B of the rotor 10. Changes in magnetic flux density caused by the rotation of the rotor 10 are large at the center-line portion of the rotor 10, and therefore detection signals indicating a clear fluctuation based on the large fluctuation can be output, and the accuracy with which the wheel speed is detected can be improved.

In particular, if the element surfaces 32a of the magnetic field detectors 30 are positioned between the outer peripheral line 10A and the inner peripheral line 10B, it can be expected that the change in magnetic flux density caused by the rotation of the rotor 10 is bigger for the plurality of magnetic field detectors 30, and the accuracy with which the speed of the wheel is detected by the wheel speed sensor 20 can be improved.

Also, if the magnetic field detectors 30 are held in the same orientation with respect to the rotor 10, the N-polarity portions 11 and the S-polarity portions 12 of the rotor 10 traverse the same direction and path with respect to each of the plurality of magnetic field detectors 30. For this reason, stable detection signals that are based on the same conditions are output from the magnetic field detectors 30. This is therefore suitable for processing such as high resolution wheel speed detection based on the detection signals of the plurality of magnetic field detectors 30.

If each of the magnetic field detectors 30 has a line symmetrical orientation with respect to any of the lines L along the radial direction of the rotor 10, the detection signals that are based on the same detection conditions are output from the magnetic field detectors 30. This is therefore suitable for processing such as high resolution wheel speed detection based on the detection signals of the plurality of magnetic field detectors 30. Also, regardless of whether the rotor 10 rotates in the forward direction or the reverse direction, the detection signals that are based on the same detection conditions are output from the magnetic field detectors 30, and it is therefore possible to more reliably detect the wheel speed regardless of whether the rotor 10 rotates in the forward direction or the reverse direction.

Also, when P is the pole pair count of the rotor 10, N is the number of the magnetic field detectors 30, and $\theta$ is the angle formed by the lines L that link the center of the rotor 10 and the magnetic field detectors 30, if $\theta=((180/N)+n\times 180)/P$ (where n is an integer of 0 or more) is satisfied, then the magnetic field detectors 30 can output detection signals at a phase difference of ((180/N)+n×180) deg with respect to the phase of the rotation of the rotor 10. For this reason, it is possible to improve the detection resolution based on the output signals of the plurality of magnetic field detectors 30.

Note that the configurations described in the above embodiments and variations can be combined as appropriate as long as they do not contradict each other.

The invention claimed is:

1. A wheel speed sensor that is to be arranged opposing a ring-shaped rotor that rotates in synchronization with rotation of a wheel and exhibits magnetic poles that are mutually different and alternate in a circumferential direction, the wheel speed sensor comprising:
    a plurality of magnetic field detectors configured to output detection signals that correspond to magnetic field fluctuation caused by rotation of the rotor; and
    an attachment member that includes an attachment portion that is to be attached to a vehicle and a holding portion that is configured to hold the plurality of magnetic field detectors, and that, in a state in which the attachment portion is attached to the vehicle, when viewed along a center axial direction of the rotor, holds the plurality of magnetic field detectors such that a center of element surfaces of the magnetic field detectors that oppose the rotor are arranged at a position that is closer to a center line than to an outer peripheral line and an inner peripheral line, the center line being a line that passes centrally between the outer peripheral line and the inner peripheral line, the outer peripheral line defining the outer periphery of the rotor and the inner peripheral line defining the inner periphery of the rotor.

2. The wheel speed sensor according to claim 1, wherein the attachment member holds the plurality of magnetic field detectors such that the plurality of magnetic field detectors have the same orientation with respect to the rotor.

3. The wheel speed sensor according to claim 2, wherein the attachment member holds the plurality of magnetic field detectors such that a line of each of the plurality of magnetic field detectors symmetric with regards to any line along a radial direction of the rotor and orthogonal to the center line.

4. The wheel speed sensor according to claim 3, wherein the attachment member holds the plurality of magnetic field detectors such that, when P is a pole pair count of the rotor, N is the number of magnetic field detectors, and θ is the angle formed by a plurality of lines that link the center of the rotor and the plurality of magnetic field detectors, θ=((180/N)+n×180)/P (where n is an integer of 0 or more) is satisfied.

5. The wheel speed sensor according to claim 2, wherein the attachment member holds the plurality of magnetic field detectors such that, when P is a pole pair count of the rotor, N is the number of magnetic field detectors, and θ is the angle formed by a plurality of lines that link the center of the rotor and the plurality of magnetic field detectors, θ=((180/N)+n×180)/P (where n is an integer of 0 or more) is satisfied.

6. The wheel speed sensor according to claim 1, wherein the attachment member holds the plurality of magnetic field detectors such that, when P is a pole pair count of the rotor, N is the number of magnetic field detectors, and θ is the angle formed by a plurality of lines that link the center of the rotor and the plurality of magnetic field detectors, θ=((180/N)+n×180)/P (where n is an integer of 0 or more) is satisfied.

* * * * *